(12) United States Patent
Dominguez Madeira et al.

(10) Patent No.: US 12,629,614 B2
(45) Date of Patent: May 19, 2026

(54) COVERS FOR LIQUID CONTAINMENT APPARATUSES AND SYSTEMS THAT INCLUDE THE SAME

(71) Applicant: Xylem Water Solutions Zelienople LLC, Zelienople, PA (US)

(72) Inventors: Salvador Dominguez Madeira, Charlotte, NC (US); Matthew Sudak, Mars, PA (US)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 822 days.

(21) Appl. No.: 17/923,106

(22) PCT Filed: May 4, 2021

(86) PCT No.: PCT/US2021/030619

§ 371 (c)(1),
(2) Date: Nov. 3, 2022

(87) PCT Pub. No.: WO2021/226058

PCT Pub. Date: Nov. 11, 2021

(65) Prior Publication Data

US 2023/0158425 A1     May 25, 2023

Related U.S. Application Data

(60) Provisional application No. 63/019,454, filed on May 4, 2020.

(51) Int. Cl.
*B65D 90/06* (2006.01)
*B01D 21/00* (2006.01)

(52) U.S. Cl.
CPC ..... *B01D 21/0006* (2013.01); *B01D 21/0003* (2013.01); *B65D 90/06* (2013.01)

(58) Field of Classification Search
CPC . B01D 21/0003; B01D 21/0006; B65D 90/06
See application file for complete search history.

(56) References Cited

U.S. PATENT DOCUMENTS

| | | |
|---|---|---|
| 1,738,829 A | 12/1929 | Jones |
| 5,049,278 A | 9/1991 | Galper |
| 5,074,427 A | 12/1991 | Siemerink et al. |
| 5,670,045 A | 9/1997 | Schaller |

(Continued)

OTHER PUBLICATIONS

Extended European Search Report issued Apr. 23, 2024 in related European Patent Application No. 21799687.5.

*Primary Examiner* — Bradley R Spies
(74) *Attorney, Agent, or Firm* — The Webb Law Firm

(57)     ABSTRACT

A cover for a liquid containment apparatus includes: a platform having a top surface, a first end, a second end opposite the first end, and two opposing sides that extend between the first and second ends. The cover also includes: a front wall extending down from the first end of the platform; a back wall extending down from the second end of the platform; side walls extending down from the opposing sides of the platform; and engagement members extending out from a bottom of the side walls in a lateral direction from the platform and which are configured to engage a surface of a substrate. The platform includes a plurality of holes, and the side walls include a plurality of notches that form a weir for distributing liquids. A liquid containment system is also included.

16 Claims, 8 Drawing Sheets

(56) References Cited

U.S. PATENT DOCUMENTS

| 2010/0243585 | A1 | 9/2010 | Dissinger et al. |
| 2014/0158592 | A1 | 6/2014 | Rinkenback |
| 2017/0056790 | A1 | 3/2017 | Brauch et al. |
| 2017/0284077 | A1 | 10/2017 | Deurloo |
| 2019/0047884 | A1 | 2/2019 | Wiley, III |

COVERS FOR LIQUID CONTAINMENT APPARATUSES AND SYSTEMS THAT INCLUDE THE SAME

CROSS REFERENCE TO RELATED APPLICATION

This application is the United States national phase of International Application No. PCT/US2021/030619, filed May 4, 2021, and claims priority to U.S. Provisional Patent Application No. 63/019,454, filed May 4, 2020, the disclosures of which are hereby incorporated by reference in their entireties.

BACKGROUND OF THE INVENTION

Field of the Invention

The present invention relates to covers for liquid containment apparatuses, and systems that include such covers and apparatuses.

Description of Related Art

Liquid containment and treatment systems typically have open channels or basins that are exposed to environmental conditions. Because open channels and basins are exposed to the environment, maintenance to remove debris and prevent wildlife from nesting is critical for continued performance of these systems. For example, inclined stainless steel lamella plate settlers and PVC lamella tube settlers accumulate solids and algae on the top surface and, therefore, require manual cleaning to remove the accumulated solids and algae. If the debris and other solids are not washed off, performance of the systems (e.g. systems that utilize clarifiers) can decrease and/or cause failures including crashing tube modules.

Considerable efforts have been expended to develop methods and devices that allow for easy and efficient inspection and maintenance of open channels and basins. However, these methods and devices have various drawbacks. For example, steel lamella plate settlers have been designed to allow operators to walk on top of the steel plates and spray water from a hose to relieve the plates from any solid accumulation. Not only are these designs complicated and expensive, they can also be dangerous as the steel plate surface is typically wet and slippery from the water disposed over the steel plate surface and from algae and other debris that accumulates on the steel plate surface.

Other examples of current designs include tube lamella settlers that utilize additional walking surfaces or bridges, but which also add additional costs and expenses. In yet other designs, operators access steel troughs using spreader bars and weirs on the side; however, the spreader bars and weirs both create trip hazards.

Thus, it is desirable to provide an effective and safe alternative for the inspection and maintenance of open channels and basins.

SUMMARY OF THE INVENTION

In one embodiment according to the present invention, a cover for a liquid containment apparatus includes: a platform having a top surface, a first end, a second end opposite the first end, and two opposing sides that extend between the first and second ends. The cover also includes: a front wall extending down from the first end of the platform; a back wall extending down from the second end of the platform; side walls extending down from the opposing sides of the platform; and engagement members extending out from a bottom of the side walls in a lateral direction from the platform and which are configured to engage a surface of a substrate. The platform includes a plurality of holes, and the side walls include a plurality of notches that form a weir for distributing liquids.

In some non-limiting embodiments, a width of both the front wall and back wall are wider than a width of the platform measured between the two opposing sides. The engagement members can also be positioned between the side walls and lateral edges of the front wall and back wall.

In certain non-limiting embodiments, the cover further includes dividing members positioned between consecutive notches and which extend out from the side walls in a lateral direction. The cover can also include support members positioned above the engagement members, in which the support members extend between consecutive dividing members, between the front wall and a dividing member, and between the back wall and a dividing member. In some non-limiting embodiments, a first space is formed between the engagement members and the support members, and a second space is formed between the support members and the side walls.

In certain non-limiting embodiments, the top surface of the platform includes raised protrusions. In some non-limiting embodiments, the plurality of notches can also have various shapes such as V-shaped notches. Further, in some non-limiting embodiments, the engagement members comprise holes that are configured to receive a fastener. The cover can also be at least partially formed from a plastic material.

In certain non-limiting embodiments, the present invention is also directed to a liquid containment system that includes: an apparatus configured to contain liquids having an opening over at least a portion of a top of the apparatus; and one or more covers positioned over at least a portion of the opening of the apparatus. The covers can each independently include any one of the covers previously described and which are further detailed herein.

In some non-limiting embodiments, the apparatus for containing liquids includes troughs configured to receive liquids, and the one or more covers are positioned along an entire length of each trough. In such embodiments, the engagement members of the covers are fastened to surfaces of the troughs.

In certain non-limiting embodiments, the system is a water treatment system that further include a clarifier positioned in the liquid containment apparatus.

The present invention is also directed to the following aspects.

A first aspect is directed to a cover for a liquid containment apparatus, the cover comprising: a platform comprising a top surface, a first end, a second end opposite the first end, and two opposing sides that extend between the first and second ends; a front wall extending down from the first end of the platform; a back wall extending down from the second end of the platform; side walls extending down from the opposing sides of the platform; and engagement members extending out from a bottom of the side walls in a lateral direction from the platform and which are configured to engage a surface of a substrate, wherein the platform comprises a plurality of holes, and the side walls comprise a plurality of notches that form a weir for distributing liquids.

A second aspect is directed to the cover of the first aspect, wherein a width of both the front wall and back wall are wider than a width of the platform measured between the two opposing sides.

A third aspect is directed to the cover of the first or second aspects, wherein the engagement members are positioned between the side walls and lateral edges of the front wall and back wall.

A fourth aspect is directed to the cover of the third aspect, further comprising dividing members positioned between consecutive notches and which extend out from the side walls in a lateral direction A fifth aspect is directed to the cover of the fourth aspect, further comprising support members positioned above the engagement members, wherein the support members extend between consecutive dividing members, between the front wall and a dividing member, and between the back wall and a dividing member.

A six aspect is directed to the cover of the fifth aspect, wherein a first space is formed between the engagement members and the support members, and wherein a second space is formed between the support members and the side walls.

A seventh aspect is directed to the cover of any one of the preceding aspects, wherein the top surface of the platform comprises raised protrusions.

An eighth aspect is directed to the cover of any one of the preceding aspects, wherein the plurality notches are V-shaped notches.

A ninth aspect is directed to the cover of any one of the preceding aspects, wherein the engagement members comprise holes that are configured to receive a fastener.

A tenth aspect is directed to the cover of any one of the preceding aspects, wherein the cover is at least partially formed from a plastic material.

An eleventh aspect is directed to a liquid containment system comprising: an apparatus configured to contain liquids comprising an opening over at least a portion of a top of the apparatus; and one or more covers positioned over at least a portion of the opening of the apparatus, the covers each independently comprising: a platform comprising a top surface, a first end, a second end opposite the first end, and two opposing sides that extend between the first and second ends; a front wall extending down from the first end of the platform; a back wall extending down from the second end of the platform; side walls extending down from the opposing sides of the platform; and engagement members extending out from a bottom of the side walls in a lateral direction from the platform and which are configured to engage a surface of a substrate, wherein the platform comprises a plurality of holes, and the side walls comprise a plurality of notches that form a weir for distributing liquids.

A twelfth aspect is directed to the system of the eleventh aspect, wherein the apparatus for containing liquids comprises troughs configured to receive liquid, and wherein the covers are positioned along an entire length of each trough.

A thirteenth aspect is directed to the system of the twelfth aspect, wherein the engagement members of the covers are fastened to surfaces of the troughs.

A fourteenth aspect is directed to the system of any one of the eleventh through thirteenth aspects, wherein a width of both the front wall and back wall of the covers are wider than a width of the platform measured between the two opposing sides.

A fifteenth aspect is directed to the system of the fourteenth aspect, wherein the engagement members of the covers are positioned between the side walls and lateral edges of the front and back walls.

A sixteenth aspect is directed to the system of the fifteenth aspect, wherein the covers further comprise dividing members positioned between consecutive notches and which extend out from the side walls in a lateral direction from the platform.

A seventeenth aspect is directed to the system of the sixteenth aspect, wherein the covers further comprise support members positioned above the engagement members, wherein the support members extend between consecutive dividing members, between the front wall and a dividing member, and between the back wall and a dividing member.

An eighteenth aspect is directed to the system of seventeenth aspect, wherein a first space is formed between the engagement members and the support members of the covers, and wherein a second space is formed between the support members and the side walls of the covers.

A nineteenth aspect is directed to the system of any one of the eleventh through eighteenth aspects, wherein the top surface of the platform of the covers comprise raised protrusions.

A twentieth aspect is directed to the system of any one of the eleventh through eighteenth aspects, wherein the system is a water treatment system that further comprises a clarifier positioned in the liquid containment apparatus.

DESCRIPTION OF THE INVENTION

Figure 1:
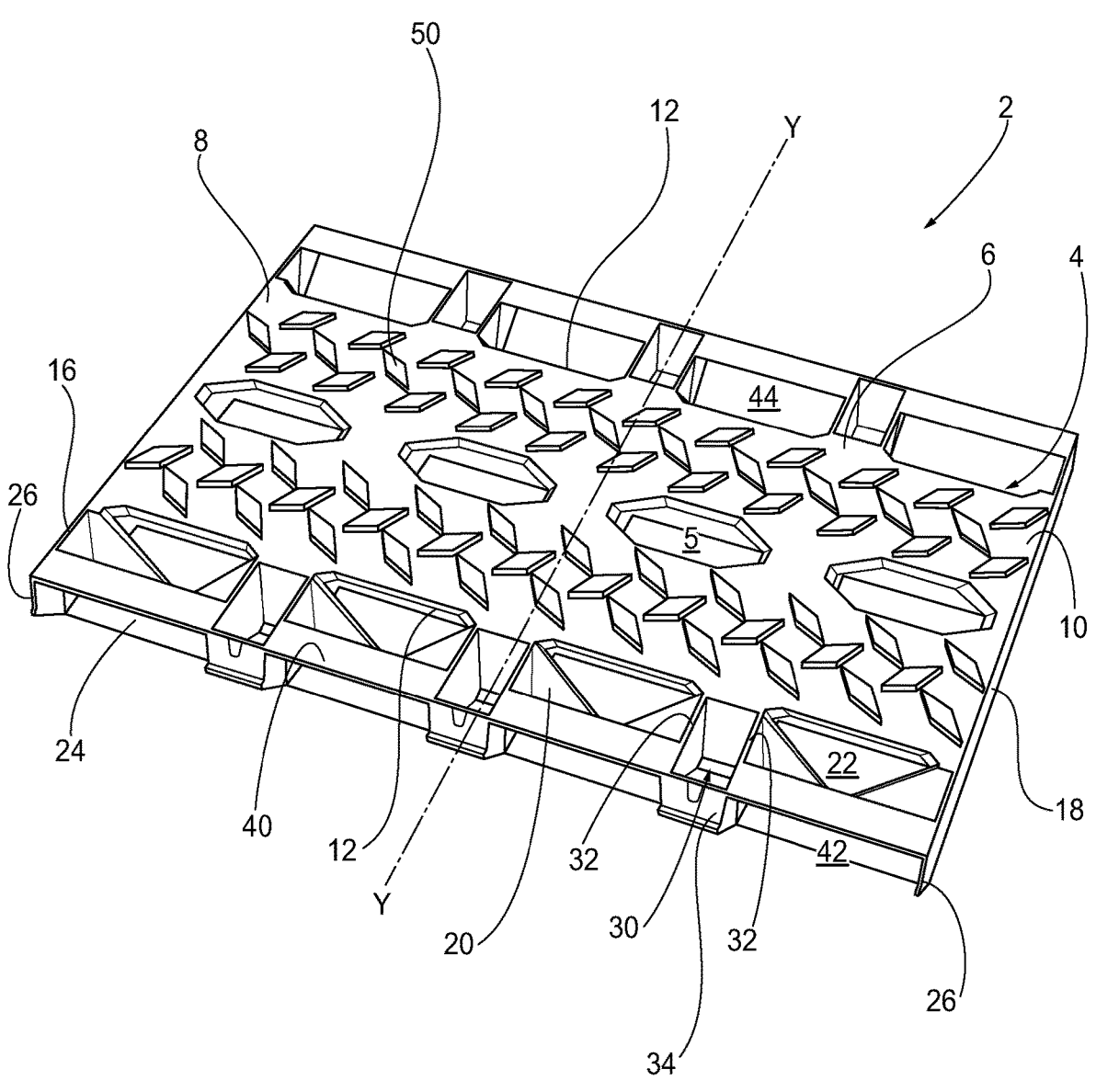
FIG. 1 is a perspective view of a cover according to an embodiment of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Figure 2:
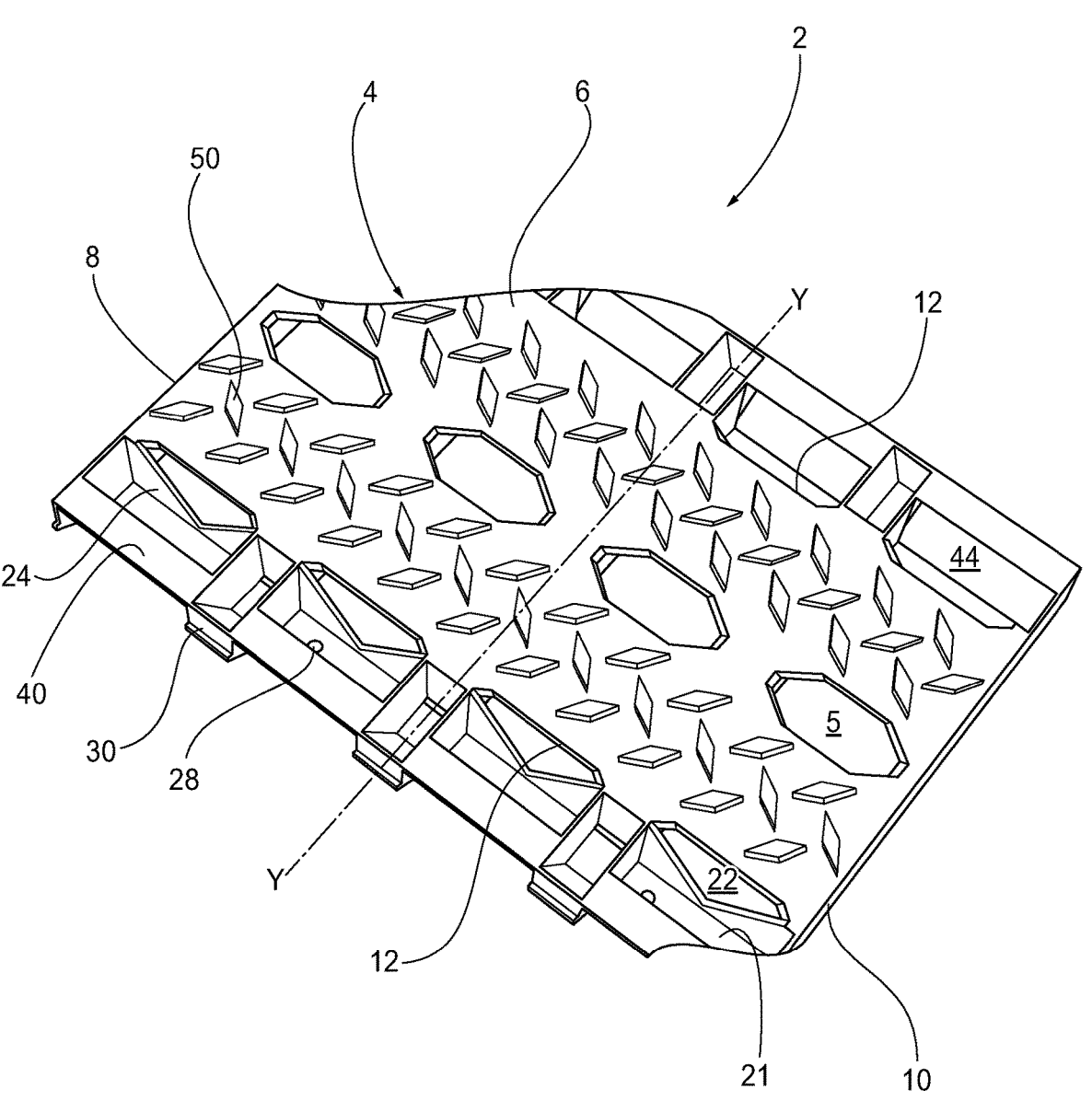
FIG. 2 is a top partial view of the cover in FIG. 1.
Figure 3:
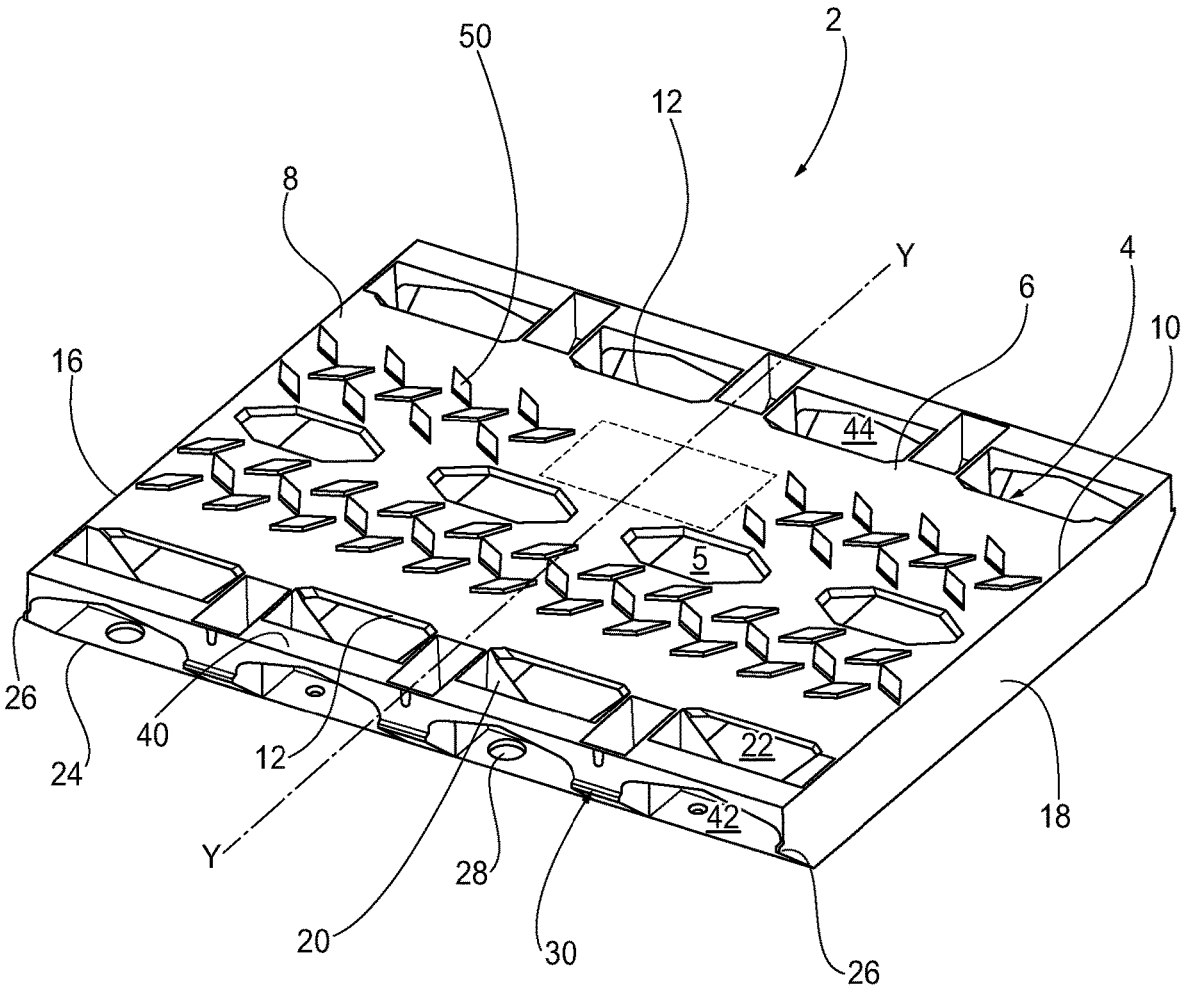
FIG. 3 a second perspective view of a cover according to an embodiment of the present invention.
Figure 4:
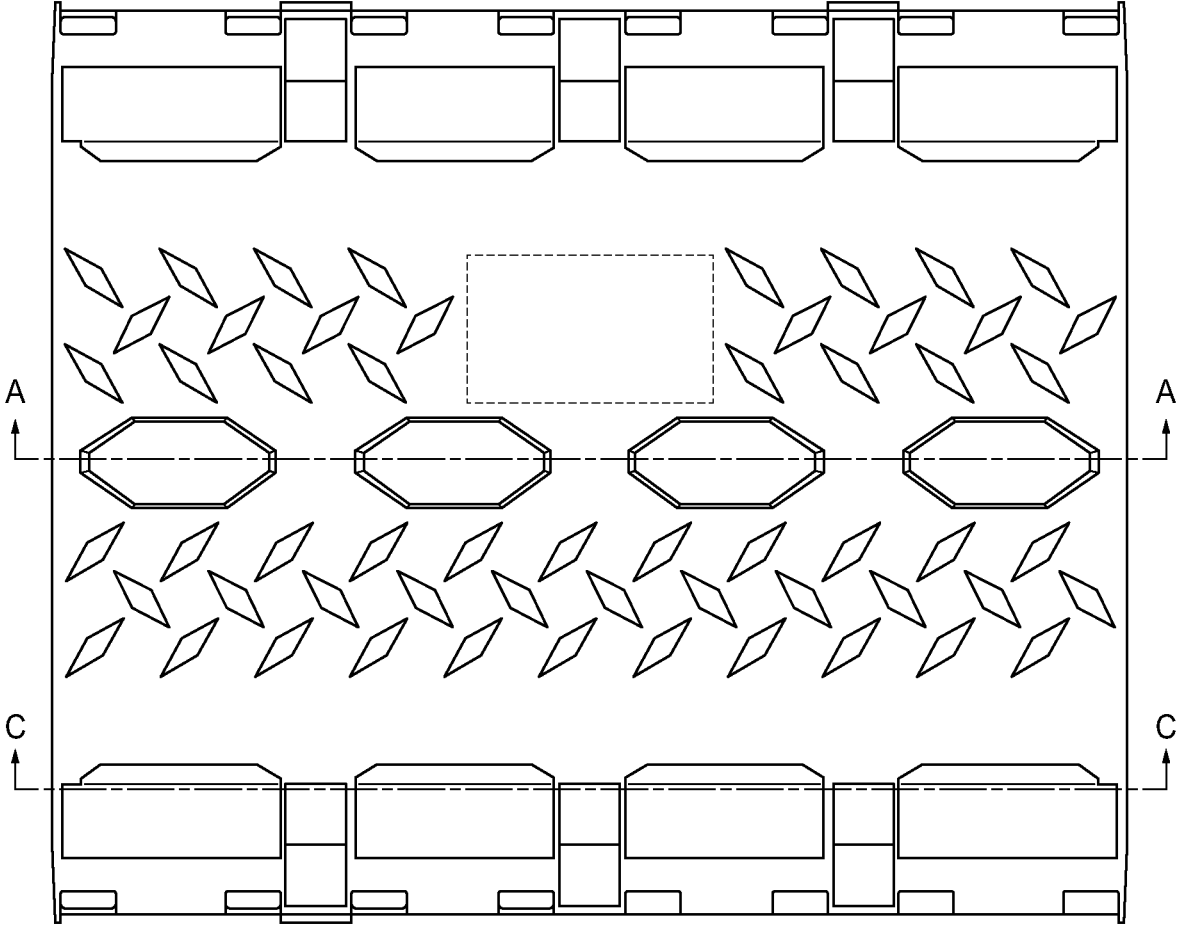
FIG. 4 is a top diagrammatic view of a cover according to an embodiment of the present invention.
Figure 5:
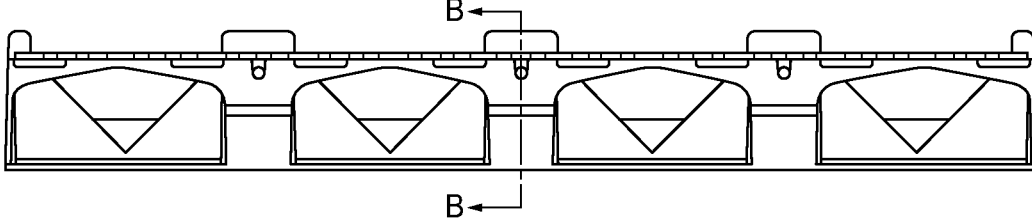
FIG. 5 is a side diagrammatic view of the cover of FIG. 4.
Figure 6:
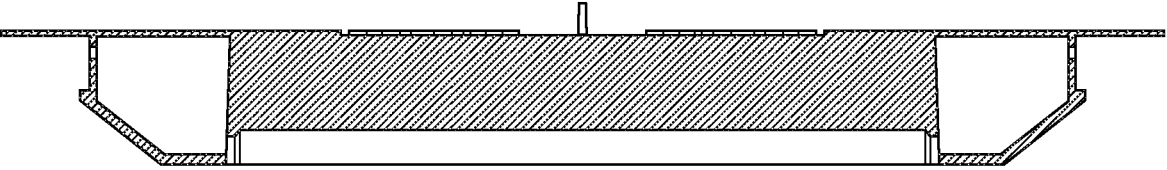
FIG. 6 is a diagrammatic view of section B-B of FIG. 5.
Figure 7:
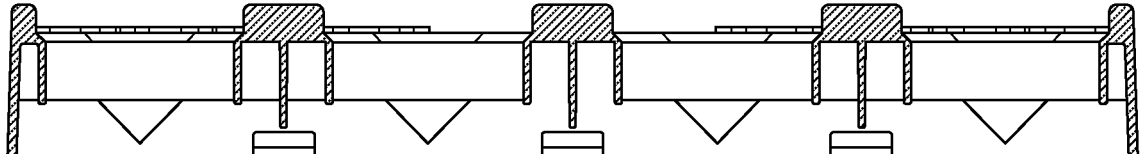
FIG. 7 is a diagrammatic view of section A-A of FIG. 4.
Figure 8:
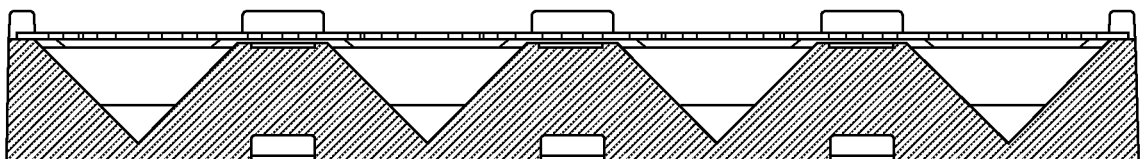
FIG. 8 is a diagrammatic view of section C-C of FIG. 4.

In one non-limiting embodiment, referring to FIGS. 1-3, a cover 2 for a liquid containment apparatus includes a platform 4 having a top surface 6, a first end 8, a second end 10 opposite the first end 8, and two opposing sides 12 that extend between the first and second ends 8, 10. As shown in FIGS. 1-3, the distance between the first end 8 and the second end 10 of the platform 4 can be greater than the distance between the two opposing sides 12 of the platform 4.

In certain non-limiting embodiments, referring again to FIGS. 1-3, the platform 4 includes a plurality of holes 5 that allow a person to view an object located on the other side of the platform 4, such as a body of water located below the platform 4. The plurality of holes 5 can therefore allow a person to inspect and view the condition of water or other fluids located on the other side of the platform 4. The plurality of holes 5 can also provide improved air circulation below the platform 4 and which can help cool various components beneath the platform 4 as well as reduce algae growth. Further, the plurality of holes 5 can help when installing the covers 2, such as for example onto troughs.

As further shown in FIGS. 1-3, a front wall 16 extends downward from the first end 8 of the platform 4 and a back wall 18 extends downward from the second end 10 of the platform 4. In certain non-limiting embodiments, the front wall 16 and back wall 18 extend down from the platform 4 at the same distance such that the height of the front wall 16 and back wall 18 are the same or substantially the same. Alternatively, the front wall 16 and back wall 18 extend down from the platform 4 at different distances such that the height of the front wall 16 and back wall 18 are different.

Referring again to FIGS. 1-3, side walls 20 extend downward from the opposing sides 12 of the platform 4. The side walls 20 can extend down from the platform 4 at the same distance such that the height of the side walls 20 are the same. The side walls 20 can also extend down from the platform 4 at the same distance as the front and back walls 16, 18 such that the height of the side walls 20 are the same as the height of the front wall 16 and back wall 18. That is, the side walls 20, front wall 16, and back wall 18 can extend down from the platform 4 at a distance such that the height of the side walls 20, front wall 16, and back wall 18 are the same. Alternatively, the side walls 20 can have different heights from each other, from the front wall 16, and/or from the back wall 18.

In certain non-limiting embodiments shown in FIGS. 1-3, the width of the front wall 16 and back wall 18 can be wider than a width of the platform 4 as measured between the two opposing sides 12. That is, the front wall 16 and back wall 18 can extend out in a lateral direction from the platform 4 (lateral direction shown as reference letter Y in FIGS. 1-3) past the side walls 20.

In accordance with the present invention, the side walls 20 have a plurality of notches 22 (i.e. openings) that form a weir for distributing liquids into or away from the cover 2. As used herein, a "weir" refers to a component that controls and distributes the flow of liquids such as water. For example, the notches 22 can form a weir for allowing liquids to flow into the cover 2, underneath the platform 4.

The plurality of notches 22 can extend along only a portion of the side walls 20 or along the entire length of the side walls 20. The notches 22 can also have various shapes and designs to control and distribute liquids as desired. For instance, the notches 22 can comprise V-shaped notches 22. Other non-limiting designs include, but are not limited to, circles, squares, rectangles, and the like.

The plurality of notches 22 can extend along both side walls 20 or along one side wall 20. In certain non-limiting embodiments, the notches 22 have the same size and/or shape. Alternatively, in some non-limiting embodiments, one or more of the notches 22 have different sizes and/or shapes.

As shown in FIGS. 1-3, the notches 22 are positioned along the side walls 20 below the platform 4. As such, liquids flow through the notches 22 below the platform 4, thereby separating the platform 4 from the flowing liquids. By separating the platform 4 from the liquids flowing through the notches 22, the slipperiness of the top surface 6 of the platform 4 is reduced since the platform 4 is not submerged below the surface of the liquids. Further, positioning the top surface 6 of the platform 4 above the liquids also reduces the build-up algae and sludge, which contributes to the slipperiness of a surface.

As shown in FIGS. 1-3, the cover 2 further includes engagement members 24 extending out from a bottom 21 of the side walls 20 in a lateral direction (lateral direction shown as reference letter Y in FIGS. 1-3) from the platform 4 and which are configured to engage a surface of a substrate. It appreciated that the engagement members 24 extend out laterally from the side walls 20 below the notches 22, which prevents the engagement members 24 from interfering with the flow of liquids through the notches 22. It is further appreciated that the platform 4 forms a horizontal structure that is raised above both the engagement members 24 and notches 22 as well as above the surfaces the engagement members 24 are placed onto.

In certain non-limiting embodiments, the engagement members 24 are positioned between the side walls 20 and lateral edges 26 of the front wall 16 and back wall 18. The engagement members 24, in some non-limiting embodiments, do not extend past the lateral edges 26 of the front and back walls 16, 18. In other embodiments, the engagement members 24 can extend past the lateral edges 26 of the front and/or back walls 16, 18.

As indicated, the engagement members 24 are configured to engage a surface of a substrate. That is, the engagement members 24 are configured to mate with a surface of a substrate to secure the cover 2 to the substrate, such as to the surface of a trough for example. For instance, the engagement members 24 may comprise holes 28 as shown in FIGS. 2-3 that are configured to receive a fastener. The holes 28 of the engagement members 24 can be positioned over holes formed in a substrate and a fastener can then be placed through the holes 20 of the engagement members 24 and the holes of the substrate to secure the cover 2 to the substrate. Non-limiting examples of fasteners include screws, nails, brackets used with screws and/or nails, and the like.

In certain non-limiting embodiments, referring to FIGS. 1-3, the cover 4 further includes dividing members 30 positioned between consecutive notches 22 and which extend out from the side walls 20 in a lateral direction (Y) from the platform 4. Each dividing member 30 can be formed from one or multiple walls that separate and form a barrier between two consecutive notches 22. For example, and as shown in FIG. 1, each dividing member 30 can include at least two walls 32 that are separated and parallel to each other and which extend out laterally from the side walls 20. A third wall 34 can also extend perpendicular between the two parallel walls 32, thereby forming an enclosed structure on all sides. It will be appreciated the dividing members 30 can provide additional structural support and separate the streams of liquid flowing through each notch 22.

Referring to FIGS. 1-3, the cover 2 may also include support members 40 positioned above the engagement members 24. The support members 40 can include an elongated wall extending between consecutive dividing members 30, between the front wall 16 and a dividing member 30, and between the back wall 18 and a dividing member 30. As further shown in FIGS. 1 and 3, a first space 42 can be formed between the engagements members 24 and the support members 40, which allows liquids to flow in and out of the notches 22 without interruption. A second space 44 can also be formed between the support members 40 and the side walls 20/platform 4. It will be appreciated that the support members can provide additional structural support.

In accordance with the present invention, the cover 2 is at least partially formed from a plastic material, such as at least the top surface 6 of the platform 4. In certain non-limiting examples, the entire cover 2 is made of a plastic material. For example, the cover 2 can be monolithically formed from a plastic material. As used herein, "monolithically formed" refers to components or structures that are formed or cast as a single piece. Accordingly, the previously described components (e.g. the platform 4, front wall 16, back wall 18, side walls 20, etc.) can be formed or cast as a single plastic piece to form the cover 2.

The plastic materials that form the cover 2 are selected to provide a load-bearing platform 4 (e.g. withstanding 200 lbs. or greater, or 300 lbs. or greater). Non-limiting examples of plastic materials that can be used to form the cover 2 include polyethylene (PE), high-density polyethylene (HDPE), glass fiber, polytetrafluoroethylene (PTFE), or any combination thereof As shown in FIGS. 1-3, the top surface 6 of the platform 4 can have raised protrusions 50 that rise above the top surface 6. The protrusions 50 provide additional traction that lowers the slipperiness of the platform 4, such as when water or other liquids are on the top surface 6 of the platform 4.

It is appreciated that the cover 2 can have different widths and lengths to fit over different portions, components, and surfaces thereof of basins, open channels, and the like. The cover 2 can also form different weir designs and sizes using different notch 22 configurations. Examples of various lengths of the platform 4 and the sidewalls 20, widths of the front and back walls 16, 18, widths of sections of protrusions 50, distances between holes 28 of the engagement members 24, and notch 22 heights and angles are illustrated in FIGS. 4-8. It is appreciated that FIGS. 4-8 are non-limiting examples and different lengths, widths, heights, angles, and shapes can be used as desired.

The cover 2 can have additional components and features to provide other properties including, but not limited to, additional support. For example, the cover 2 can comprise secondary support members that extend under the platform 4 that help to provide additional structural support.

Figure 9:
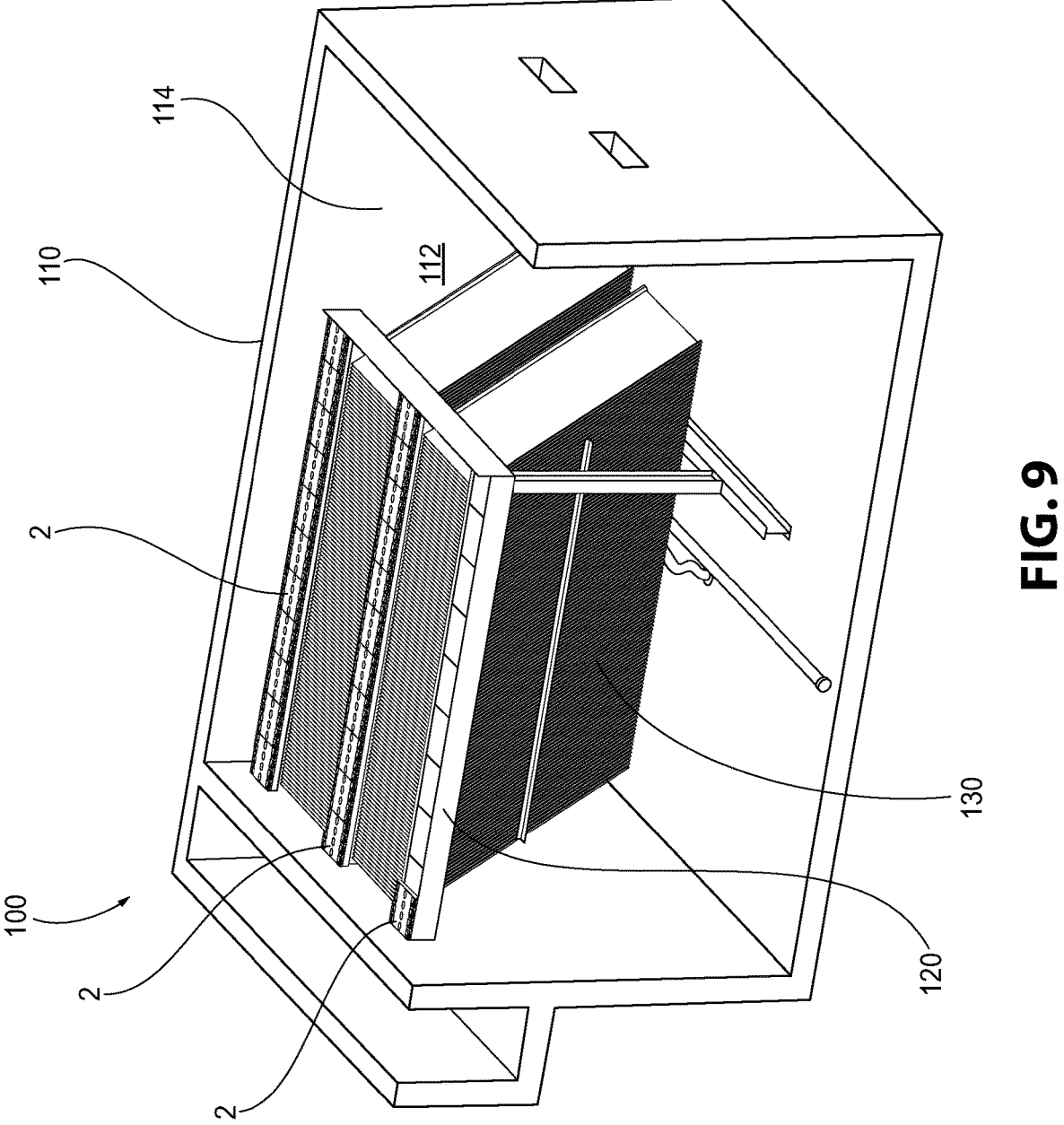
FIG. 9 is a perspective view of a liquid containment system that includes covers according to an embodiment of the present invention.

As shown in FIG. 9, the present invention is also directed to a liquid containment system 100 that includes an apparatus 110 configured to contain liquids having an opening 112 over at least a portion of a top 114 of the apparatus 110. Non-limiting examples of apparatuses 110 configured to contain liquids include various types of basins, channels, tanks, and vessels. Non-limiting examples of liquids that can be contained in the apparatus 110 include water, oil, gas, pulp, and paper. Further, the liquid can include, for example, solutions, dispersions, emulsions, and various other forms.

As further shown in FIG. 9, covers 2 are positioned over at least a portion of the opening 112 of the apparatus 110. The covers 2 can be selected from any of the previously described covers 2. It is appreciated that one cover 2 can be positioned over the portion of the opening 112. Alternatively, a plurality of covers 2 can be placed over the portion of the opening 112. For example, a plurality of covers 2 can be placed from end to end across only a portion of the opening 112 on the top 114 of the apparatus 110, or the covers 2 can be placed from end to end across the entire opening 112 on the top 114 of the apparatus 110.

Figure 10:
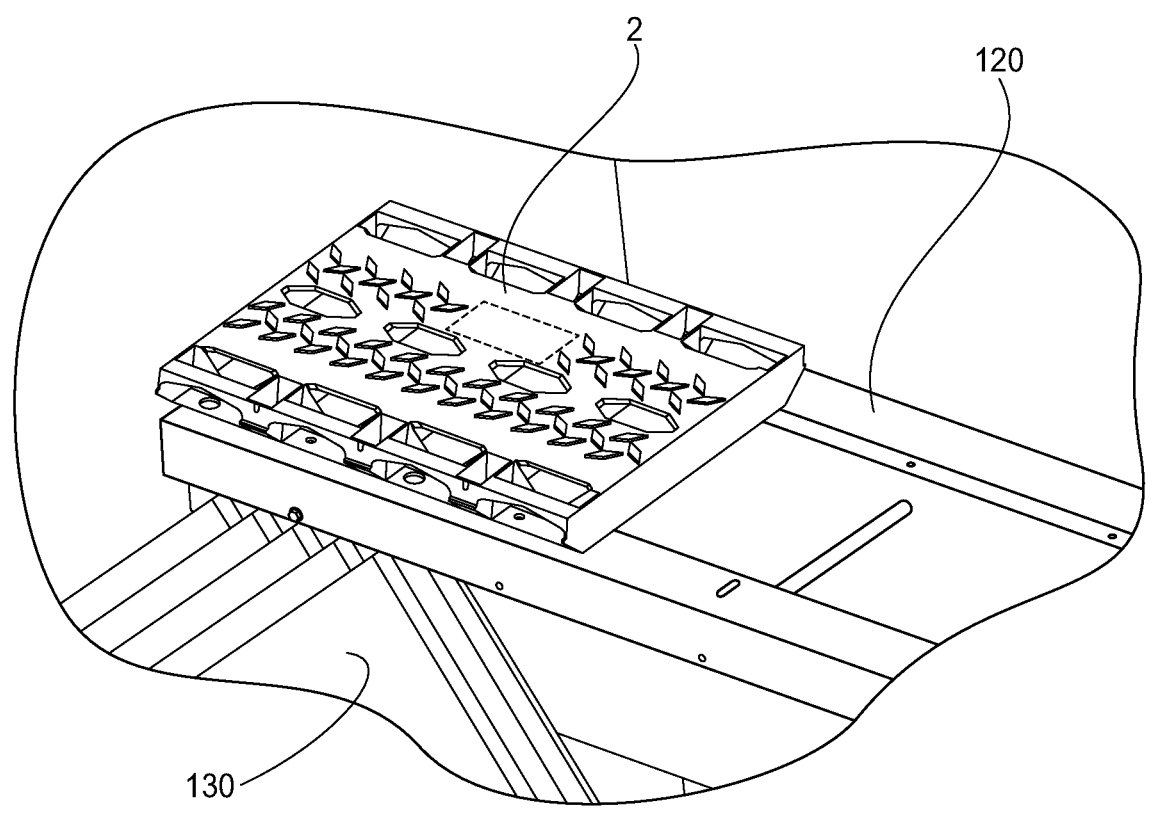
FIG. 10 is an enlarged view of a cover positioned over a trough in a liquid containment system that includes a clarifier according to an embodiment of the present invention.

The engagement members 24 of the covers 2 can be placed over surfaces found on, within, or around the top 114 of the apparatus 110. The engagement members 24 can then be fastened to the surfaces using holes 28 and fasteners as previously described to secure the engagement members 24 to the surfaces. In certain non-limiting embodiments shown in FIGS. 9-10, the apparatus 110 comprises troughs 120 configured to receive liquid, and the covers 2 are positioned along only a portion, or an entire length, of each trough 120. It is appreciated that a single cover 2 or a plurality of covers 2 could be positioned along only a portion, or an entire length, of each trough 120. In some non-limiting examples, the engagement members 24 of the covers 2 can be placed over and fastened to surfaces of the troughs.

The previously described liquid containment system 100 can be used in various liquid apparatuses 110. For example, in certain non-limiting embodiments, the previously described liquid containment system 100 is a water treatment system and can further include, for example, a clarifier 130.

A non-limiting example of a system 100 that utilizes a clarifier 130 is described in U.S. Patent Application Publication No. 2019-047884, which is incorporated by reference in its entirety. For example, the covers 2 described herein can be placed onto collection troughs 120 that are configured to receive clarified water flowing through a clarifier 130, such as a clarifier described in U.S. Patent Application Publication No. 2019-047884.

It was found that the previously described cover 2 can act as a walkway, catwalk, access point, or the like to allow a person to inspect and service a liquid containment system 100, such as for example open channels and basins in a water treatment system. The platform 4 of the cover 2 further protects the liquid containment system 100 from debris and wildlife without compromising the ability to inspect the liquid containment system 100 due to the plurality of holes 5 formed through the platform 4. Moreover, the integral notches 22 that form the weir allow liquid to flow evenly through the side walls 20 of the cover 2, such as into a trough 120 for example.

Further, and as previously described, the slipperiness of the top surface 6 of the platform 4 is reduced since the platform 4 is positioned above the notches 22 and not submerged below the surface of the liquids that flow through the notches 22. Moreover, the cover 2 can be made of a load-bearing plastic material that can hold an individual without bending or caving and which is a cost effective alternative to conventional metal devices. The plastic material is also lighter as compared to metal materials and is therefore easier to install, adjust, and replace.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the description. For example, it is to be understood that the present invention contemplates that, to the extent possible, one or more features of any embodiment can be combined with one or more features of any other embodiment.

The invention claimed is:

1. A cover for a liquid containment apparatus, the cover comprising:
   a platform comprising a top surface, a first end, a second end opposite the first end, and two opposing sides that extend between the first and second ends;
   a front wall extending down from the first end of the platform;
   a back wall extending down from the second end of the platform;
   side walls extending down from the opposing sides of the platform; and
   engagement members extending out from a bottom of the side walls in a lateral direction from the platform and which are configured to engage a surface,
   wherein the platform comprises a plurality of holes, and wherein the side walls comprise a plurality of notches that form a weir for distributing liquids,
   wherein a width of both the front wall and back wall are wider than a width of the platform measured between the two opposing sides, and
   wherein the engagement members are positioned between the side walls and lateral edges of the front wall and back wall.

2. The cover of claim 1, further comprising dividing members positioned between consecutive notches and which extend out from the side walls in a lateral direction.

3. The cover of claim 2, further comprising support members positioned above the engagement members, wherein the support members extend between consecutive dividing members, between the front wall and a dividing member, and between the back wall and a dividing member.

4. The cover of claim 3, wherein a first space is formed between the engagement members and the support members, and wherein a second space is formed between the support members and the side walls.

5. The cover of claim 1, wherein the top surface of the platform comprises raised protrusions.

6. The cover of claim 1, wherein the plurality notches are V-shaped notches.

7. The cover of claim 1, wherein the engagement members comprise holes that are configured to receive a fastener.

8. The cover of claim 1, wherein the cover is at least partially formed from a plastic material.

9. A liquid containment system comprising:
   an apparatus configured to contain liquids comprising an opening over at least a portion of a top of the apparatus; and
   one or more covers positioned over at least a portion of the opening of the apparatus, the covers each independently comprising:
      a platform comprising a top surface, a first end, a second end opposite the first end, and two opposing sides that extend between the first and second ends;
      a front wall extending down from the first end of the platform;
      a back wall extending down from the second end of the platform;
      side walls extending down from the opposing sides of the platform; and
      engagement members extending out from a bottom of the side walls in a lateral direction from the platform and which are configured to engage a surface of a substrate,
      wherein the platform comprises a plurality of holes, and wherein the side walls comprise a plurality of notches that form a weir for distributing liquids,
      wherein a width of both the front wall and back wall of the covers are wider than a width of the platform measured between the two opposing sides, and the engagement members of the covers are positioned between the side walls and lateral edges of the front and back walls.

10. The system of claim 9, wherein the apparatus for containing liquids comprises troughs configured to receive liquid, and wherein the covers are positioned along an entire length of each trough.

11. The system of claim 10, wherein the engagement members of the covers are fastened to surfaces of the troughs.

12. The system of claim 9, wherein the covers further comprise dividing members positioned between consecutive notches and which extend out from the side walls in a lateral direction from the platform.

13. The system of claim 12, wherein the covers further comprise support members positioned above the engagement members, wherein the support members extend between consecutive dividing members, between the front wall and a dividing member, and between the back wall and a dividing member.

14. The system of claim 13, wherein a first space is formed between the engagement members and the support members of the covers, and wherein a second space is formed between the support members and the side walls of the covers.

15. The system of claim 9, wherein the top surface of the platform of the covers comprises raised protrusions.

16. The system of claim 9, wherein the system is a water treatment system that further comprises a clarifier positioned in the liquid containment apparatus.

* * * * *